US005510942A

United States Patent [19]

Bock et al.

[11] Patent Number: 5,510,942

[45] Date of Patent: Apr. 23, 1996

[54] SERIES-CAPACITOR COMPENSATION EQUIPMENT

[75] Inventors: Larry E. Bock, South Glens Falls; John C. Hill, Jr., Ballston Spa, both of N.Y.; Josef Urbanek, Media, Pa.

[73] Assignee: General Electric Company, Plainville, Conn.

[21] Appl. No.: 358,404

[22] Filed: Dec. 19, 1994

[51] Int. Cl.[6] .......... H02H 9/04

[52] U.S. Cl. .......... 361/16; 361/58; 361/126

[58] Field of Search .......... 361/16, 115, 126, 361/127, 58

[56] References Cited

U.S. PATENT DOCUMENTS 4,164,772 8/1979 Hingorani .......... 361/16

4,652,963 3/1987 Fahlen .......... 361/58

*Primary Examiner*—Todd Deboer

*Attorney, Agent, or Firm*—Henry J. Policinski; Carl B. Horton; William Freedman

[57] ABSTRACT

This series-capacitor compensation equipment comprises a series-capacitor bank in series with a power line and an overvoltage protection circuit for the capacitor bank comprising the series combination of a surge arrester and electric bus structure connected in series with the power line and in parallel with the capacitor bank. The surge arrester includes metal-oxide varistor elements which impart a relatively high resistance to the arrester when the voltage across the arrester is in a normal range and a relatively low resistance when the voltage across the arrester rises to a predetermined value that produces arrester operation. The capacitor bank will discharge through the overvoltage protective circuit should a varistor element fail during arrester operation. The bus structure comprises stainless-steel bus conductor having a resistance that is sufficiently high to effectively limit the energy duty on the arrester during discharge of the capacitor bank through the overvoltage protection circuit in the event of failure of a varistor element during arrester operation.

10 Claims, 5 Drawing Sheets

SERIES-CAPACITOR COMPENSATION EQUIPMENT

CROSS-REFERENCE TO RELATED APPLICATION

This application is related to U.S. Pat. No. 5,402,100—Urbanek et al, filed on Dec. 6, 1993, and assigned to the assignee of the present invention, which application is incorporated by reference in the present application.

1. Field of the Invention

This invention relates to series-capacitor compensation equipment comprising a series-capacitor bank and a surge arrester of the metal-oxide varistor type connected in parallel with the capacitor bank and, more particularly, relates to means for limiting the energy duty on the surge arrester in the unusual event of a failure of a metal-oxide varistor element within the arrester during operation of the arrester.

2. Background

In the type of compensation equipment that we are concerned with, there is a series-capacitor bank for connection in series with a power line and an overvoltage protection circuit for the capacitor bank connected in parallel with the capacitor bank and in series with the power line. The overvoltage protection circuit comprises the series combination of a surge arrester and electric bus structure that connects the surge arrester into the power line circuit. The surge arrester comprises an insulating housing and one or more stacks of metal-oxide varistor elements within the insulating housing; and the bus structure is located externally of the insulating housing and is connected electrically in series with the stack(s) of varistor elements. The varistor elements are normally in a high-resistance state that substantially blocks current through the overvoltage protection circuit under normal voltage conditions. But should a fault appear on the power line, the resulting high fault current will cause a rapid rise in the voltage across the capacitor bank. This rising voltage, upon reaching a predetermined level, will cause the varistor elements to switch to their low-resistance state, which allows excess current above the rating of the capacitor bank to pass through the varistor elements, thus protecting the capacitor bank from excess current and voltage. Normally, when the fault is cleared, the varistor elements will return to their high-resistance state.

Normally, the surge arrester will be capable of operating as above described without any arc developing within the arrester housing. But under unusual circumstances involving a power-line fault, one or more of the varistor elements might fail, and this could lead to an arc developing within the arrester housing. This arc would quickly lengthen and, in effect, constitute a short-circuit path bypassing the stack(s) of varistor elements and appearing as a short circuit across the capacitor bank. This could result in the capacitor bank rapidly discharging through the arrester, producing through the arrester a relatively high frequency current with extremely high peak values. This high frequency current, especially when combined with the fault current that would then be flowing through the arrester, would impose upon the arrester an extremely high energy burden that is characterized by an extremely high rate of energy input. In prior series-capacitor compensation equipments of this general type, there is a significant possibility that this high energy burden imposed on the surge arrester can cause its insulating housing to rupture in a violent manner.

Accordingly, one concern of our invention is to reduce the energy burden imposed on the arrester by discharge of the capacitor bank in the event of a varistor element failure during operation of the arrester.

Another concern of our invention is to effect such a reduction in the energy burden by simple means that is able to withstand without damage the high currents and the high energy input resulting from a varistor element failure during arrester operation.

Still another concern of our invention is to effect the desired reduction in energy burden by simple means which can be introduced into the compensation equipment without significantly affecting the protective level of the equipment, i.e., the maximum voltage allowed by the arrester to develop across the capacitor bank.

SUMMARY

In carrying out the invention in one form, we utilize for the electric bus structure that connects the surge arrester into the power-circuit, conductive structure comprising bus conductor made of stainless steel. This stainless-steel bus conductor has a resistance sufficiently high to effectively limit the peak amplitude of the capacitor discharge current to a value substantially lower than that which would flow under corresponding capacitor-discharge conditions in an otherwise corresponding series-capacitor compensation equipment in which the surge arrestor is connected into the power-line circuit by electric bus structure made substantially entirely of aluminum bus conductor of much larger cross-section than the stainless-steel bus conductor.

BRIEF DESCRIPTION OF FIGURES

For a better understanding of the invention, reference may be had to the following detailed description taken in connection with the accompanying drawings, in which.

DETAILED DESCRIPTION OF EMBODIMENT

Figure 1:
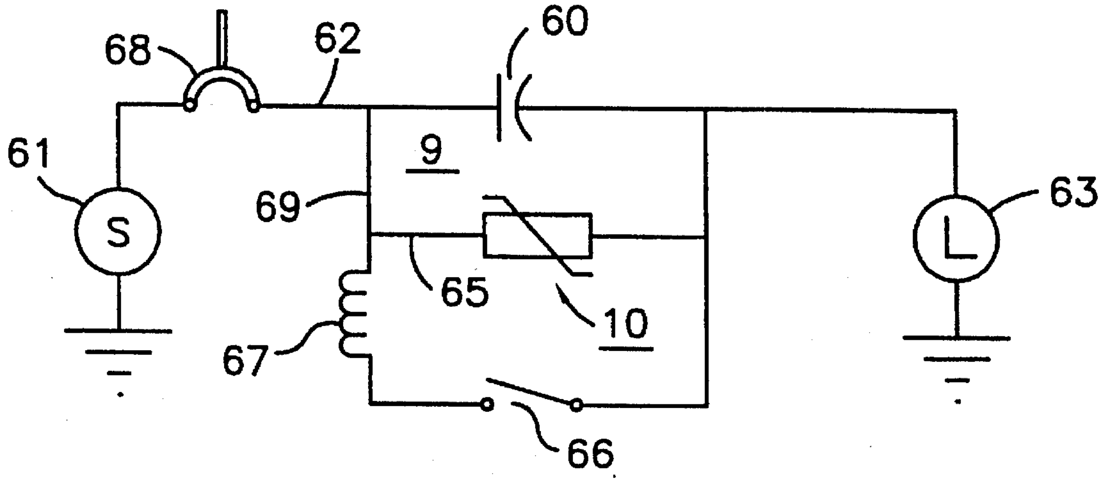
FIG. 1 is a simplified circuit diagram showing our series-capacitor compensation equipment connected in a power system.

Referring now to FIG. 1, the power system schematically illustrated therein comprises a source 61, a load 63, and a high-voltage power line 62 interconnecting the source and the load. A suitably-controlled, normally-closed circuit breaker 68 connects the source 61 to the power line 62 and can open under predetermined conditions to protect the power system from certain abnormal currents, all in a conventional manner.

The power system of FIG. 1 further comprises series-capacitor compensation equipment 9 comprising a series-capacitor bank 60 connected in series with the high voltage power line 62 and an overvoltage protection circuit 69 connected in parallel with the capacitor bank and in series with the power line 62. The overvoltage protection circuit 69 comprises a surge arrester 10 and electric bus structure 65 located externally of the surge arrester for connecting the surge arrester into the power line 62. The compensation equipment 9 of FIG. 1 further includes, in parallel with the arrester 10, the series combination of an inductance 67 and a normally-open by-pass switch 66. The by-pass switch is operated to closed position under certain conditions soon to be described.

Figure 2:
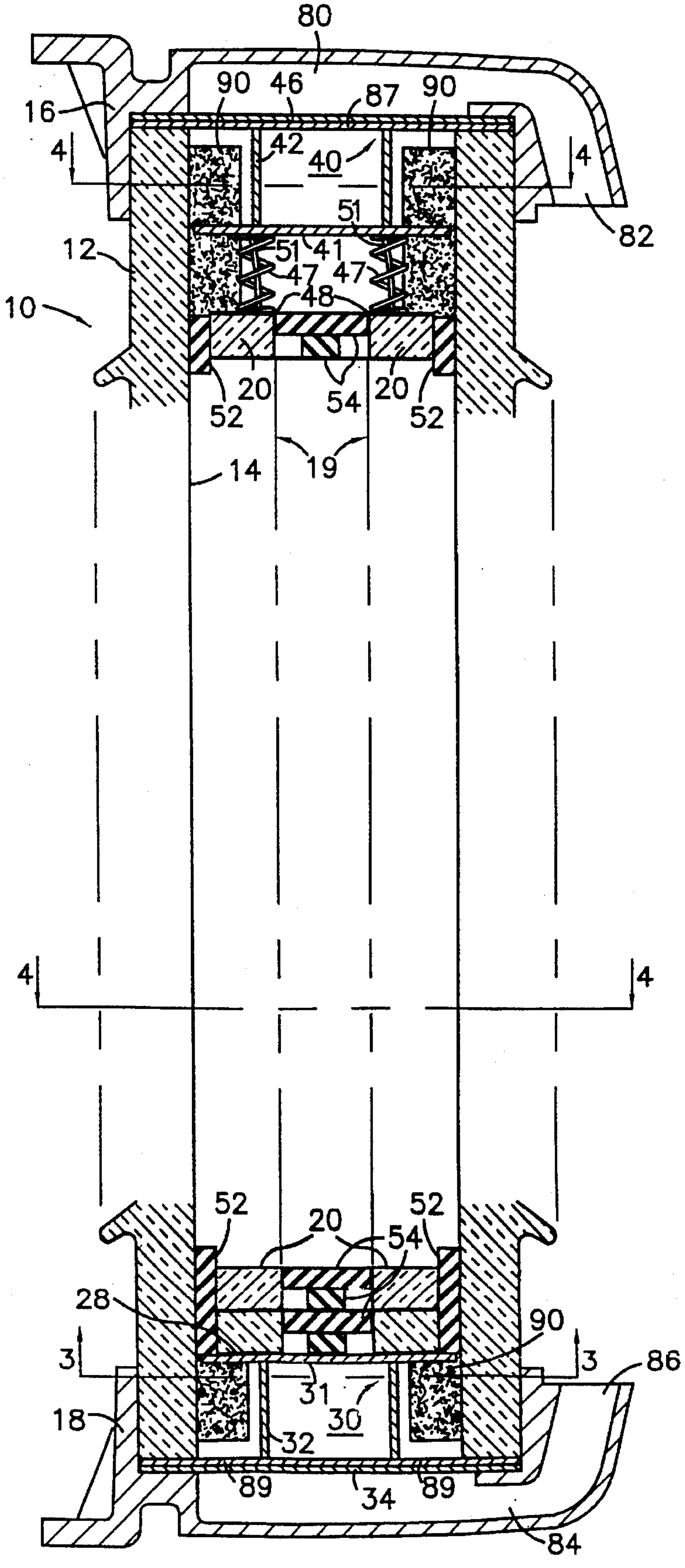
FIG. 2 is side-elevational sectional view of one form of a surge arrester utilized in the series-capacitor compensation equipment of FIG. 1.
Figure 3:
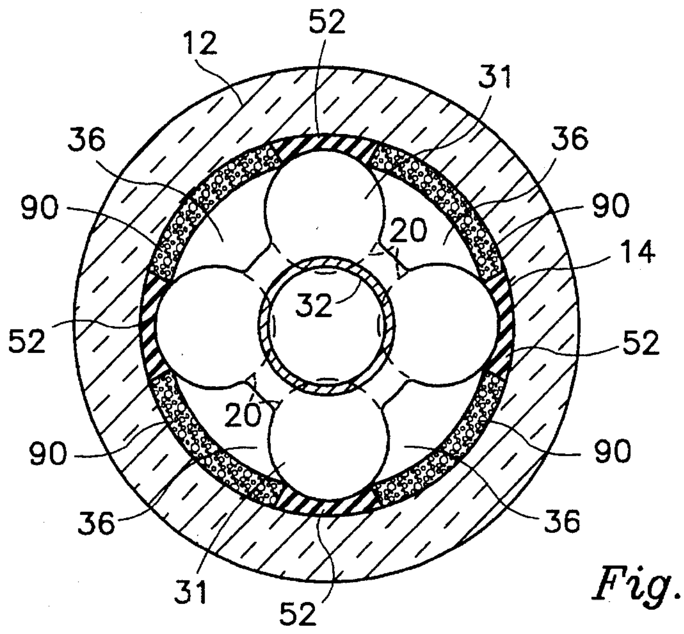
FIG. 3 is a sectional view taken along the line 3—3 of FIG. 2.
Figure 4:
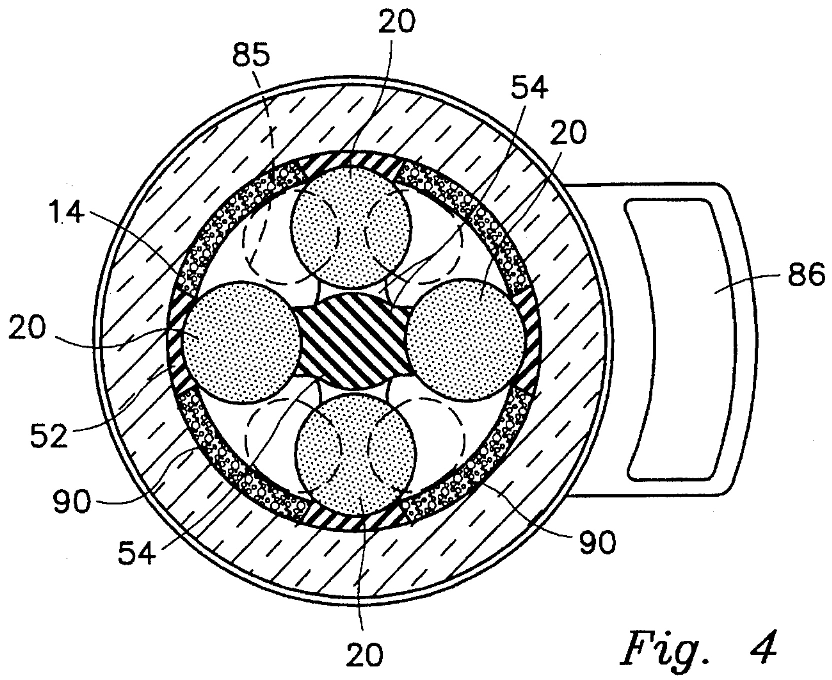
FIG. 4 is a sectional view taken along the line 4—4 of FIG. 2.

In one embodiment of the invention, the surge arrester 10 is constructed as described and claimed in the above-referred-to U.S. application Ser. No. 08/163,273—Urbanek et al. FIG. 2 of the present application is a cross-sectional view of such surge arrester corresponding to FIG. 1 of the Urbanek et al application. The illustrated surge arrester comprises a porcelain insulating housing 12 having a bore 14 extending between the upper and lower ends of the housing. Fixedly mounted on the upper end of the housing 12 is a first metal end cap serving as one terminal of the arrester, and fixedly mounted on the lower end of the housing 12 is a second metal end cap 18 serving as the opposite terminal of the arrester. Electrically connected between the two terminals are four stacks 19 of varistor elements 20, the stacks being located adjacent the bore 14 of the housing and angularly spaced thereabout by equal distances, as best shown in the transverse cross-sectional views of FIGS. 3 and 4.

Figure 5:
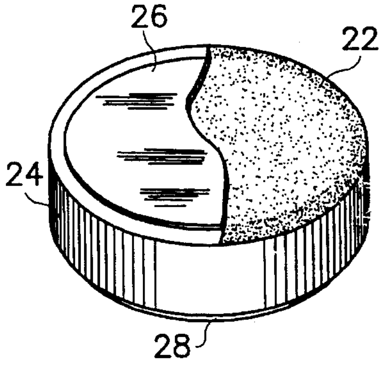
FIG. 5 is a perspective view of one of the varistor disks used in the arrester of FIG. 2.

Each varistor element 20 is of the conventional construction depicted in FIG. 5, comprising a circular disk 22 of sintered metal-oxide material, a thin glass or ceramic collar 24 bonded to the circular outer periphery of the disk 22, and flat metal electrodes 26 and 28 bonded to the upper and lower faces of disk 22. Each disk 22 is of conventional metal-oxide varistor formulation, preferably one containing as its principal constituent zinc oxide; and the electrodes 26 and 28 are of a good conductivity material, preferably arc or flame-sprayed aluminum. The electrodes are free to make good contact with the juxtaposed electrodes of adjacent varistor elements when the varistor elements are stacked and pressed axially together in the assembled arrester.

The varistor elements in each stack 19 are electrically connected in series between the terminals 16 and 18 of the arrester, and the stacks are electrically connected in parallel between these terminals. Compression springs 47 at the upper end of the arrester urge their associated varistors stacks downwardly against a conductive support plate 31 at the bottom end of the arrester, thereby compressing the stacks and maintaining good electrical contact between the adjacent electrodes of the juxtaposed varistor elements in each stack.

To promote effective heat transfer between the varistor stacks 19 and the insulating housing 12, strips 52 of good thermal conductivity electrical insulating material, such as a suitable silicon rubber, are sandwiched between the stacks 19 and the bore 14 of the insulating housing. Resilient spacer wedges 54 stacked along the length of the varistor stacks 19 in a location radially inward of varistor stacks exert radially-outward forces on the stacks, thereby compressing the strips 52 and providing good contact between the varistor stacks and the bore 14.

For a detailed description of additional features of the arrester, reference may be had to the aforesaid Urbanek et al application Ser. No. 08/163,273. Some of these features will be referred to hereinafter in the present application.

Under normal voltage conditions on the line 62, the varistor elements 20 in the arrester 10 are in a high-resistance state. But should a fault appear on the line, current through the line will rapidly increase, causing the voltage across the series-capacitor bank to rapidly increase. The varistor elements will respond to the rising series-capacitor voltage by switching to a low resistance state that allows excess current above the series-capacitor rating to pass through the varistor elements while effectively limiting the voltage across them, thereby protecting the series capacitor from the excess voltage and current. Normally, when the fault is cleared, the varistor elements will return to their high-resistance state.

In the illustrated arrester the four parallel-connected varistor stacks 19 will normally share the current through the arrester when the arrester operates as above described, and no arc will develop within the interrupter housing. Under unusual circumstances, however, one or more of the varistor elements 20 might fail, and this could lead to an arc developing within the housing alongside one of the varistor stacks 19. This arc would quickly lengthen and, in effect, constitute a short circuit path by-passing the varistor stacks and appearing as a short circuit across the capacitor bank 60. This could result in the capacitor bank rapidly discharging through the arrester 10, producing through the arrester a relatively high-frequency current with extremely high peak values. A typical such current would have a frequency of several thousand Hz and a peak value of several hundred kA.

Figure 6:
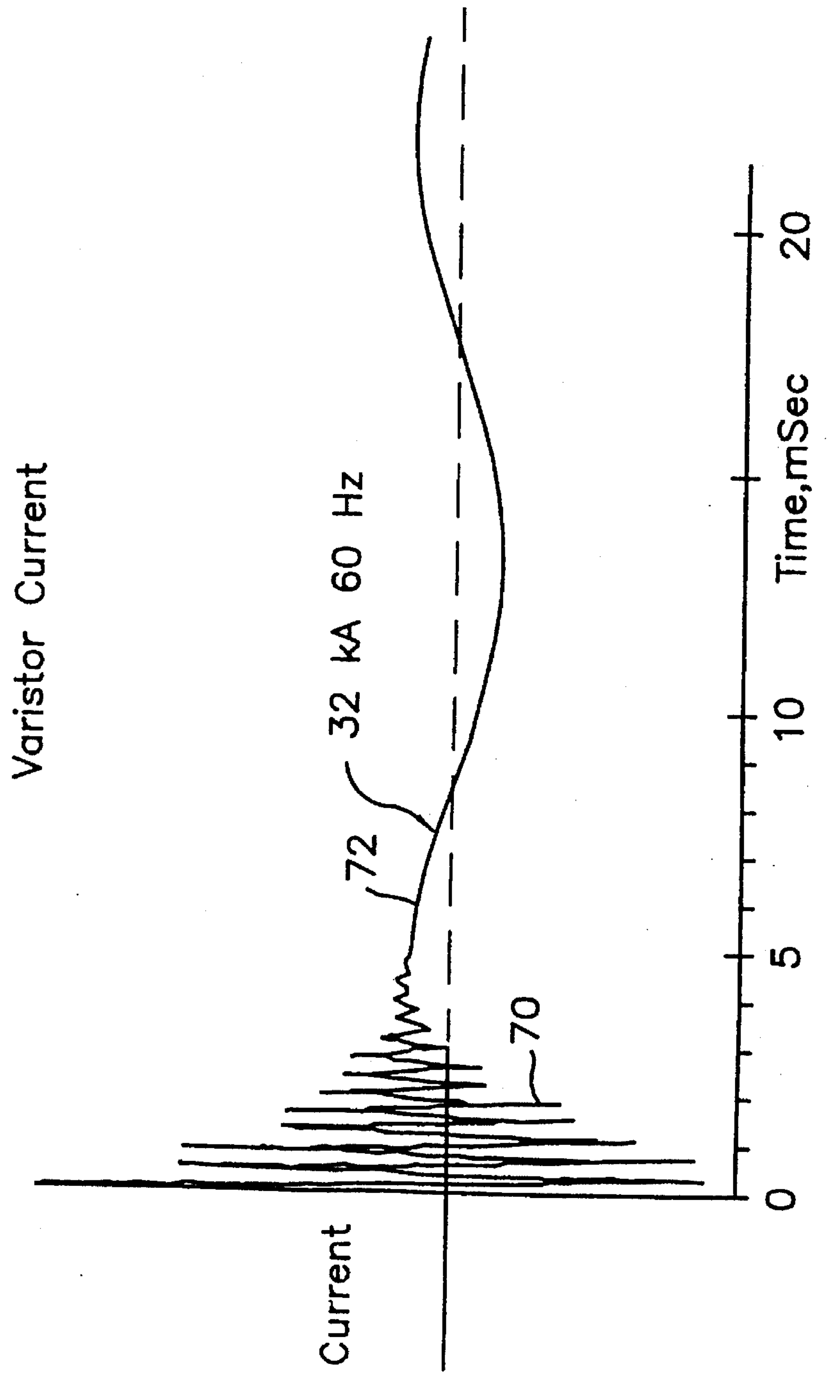
FIG. 6 is a graph showing certain current conditions that can occur in the event that a varistor in the arrester of FIGS. 1 and 2 should fail while the arrester is operating.

Under most circumstances, this capacitor discharge current is accompanied by a high power-frequency fault current through the arrester from the source 61 of the power line 62. This power-frequency current might typically be 30 to 40 kA RMS in amplitude and 60 Hz in frequency. This current condition is represented in the graph of FIG. 6, where the capacitor discharge current is depicted at 70 and the current from the line 62 is depicted at 72. It will be apparent that this combination of high currents flowing through an arc in the arrester imposes upon the arrester an extremely high energy burden that is characterized by an extremely high rate of energy input.

To protect the porcelain housing 12 of the arrester from rupturing under these high-energy arcing conditions, the end caps 16 and 18 of the arrester are provided with vents, which may be of a conventional design, for rapidly venting from the housing interior the hot gases developed by the high-current arc within the housing. Referring to FIG. 2, the vent in the upper end cap 16 comprises a large exhaust passage 80 extending transversely of the housing and terminating in a nozzle 82 pointing downwardly in a location outside the housing 12. The vent in the lower end cap 18 comprises a large exhaust passage 84 extending transversely of the housing and terminating in a lower nozzle 86 aligned with the upper nozzle 82 and pointing upwardly. The upper exhaust passage 80 is normally isolated from the interior of the housing 12 by a frangible diaphragm 87 that provides a seal between the interior and the exhaust passage 80; and the lower exhaust passage 84 is normally isolated from the interior of the housing 12 by a corresponding frangible diaphragm 89 that provides a seal between the interior and the lower exhaust passage 84. The two diaphragms 87 and 89 are preferably of metal, and each is backed-up by a cutter plate having large sharp-edge holes in it. The upper cutter plate is shown at 46 and the lower one at 34. When an arc-produced high pressure suddenly develops within the interior of the arrester, the diaphragms 87 and 89 are abruptly forced outwardly against their associated cutter plates and are cut at the sharp edges of the holes in the cutter plates, the pressure acting to expel the cut-out portions of the diaphragms through the holes in the cutter plates, all in a conventional manner. When the diaphragms are thus ruptured, the pressurized gas within the interior of the housing 12 is free to discharge through the exhaust passages 80 and 84 and the nozzles 82 and 86. The hot ionized gases issuing from the two nozzles converge, establishing outside the arrester housing a low dielectric strength path that quickly breaks down, allowing an arc to develop between the opposed end caps in a location outside the housing. In effect, the arc that had been inside the housing 12 is rapidly transferred to a location outside the housing, thereby limiting the quantity of gases and the resulting temperatures and pressures developed within the housing interior. The above-described rupturing of the diaphragms and transfer of the arc are, in general, conventional modes of operation in this type of arrester and are believed to require no further explanation in this application. When the arc is transferred to its location outside the housing 12, it is extinguished immediately thereafter by closing the normally-open by-pass switch 66 (FIG. 1) that is connected in parallel with the surge arrester 10. Current through the by-pass switch 66 is then interrupted by opening of the circuit breaker 68 (FIG. 1).

The main purpose of the diaphragms 87 and 89 within the arrester is to provide a protective seal for the interior of the arrester that allows the interior to be filled with an appropriate gas filler isolated from the outside ambient. A preferred filler is dry air.

Although the above-described rupture of the diaphragms 87 and 89 and transfer of the arc to an outside location occur very quickly, e.g., within a few milliseconds or less following initiation of the arc within the arrester housing, under the extreme high-energy conditions described above, rupture of the porcelain housing can still be a problem in the absence of supplemental protection. One form of supplemental protection is located within the arrester housing and is the subject of the aforesaid Urbanek et al application Ser. No. 08/163,273. This protection, in the arrester of FIGS. 2 and 3, comprises four liners in the form of blankets 90, each made of matted-together alumina fibers, and each extending along the length of the porcelain housing 12 in positions angularly between the heat-transfer strips 52 of the four varistor stacks. These blankets 90 are located immediately adjacent the bore 14 and are bonded thereto by a refractory adhesive that is essentially free of organic binders. The blankets 90 cover all portions of the bore 14 that are located between strips 52 so that there is essentially no exposed porcelain in this region.

Under the above-described high-current conditions, the arc that is formed upon spark-over of a varistor element extends alongside one of the varistor stacks 19, quickly lengthening to substantially the whole length of the varistor stack. The intense heat and pressure developed by such an arc soon melt the alumina blanket in the channel immediately adjacent the arc and thereby convert most of this alumina blanket into a glaze that covers most of the interface that formerly was present between that particular blanket and the bore 14 of the housing.

The alumina blankets 90 have a number of significant properties that enable them effectively to protect the porcelain housing from being ruptured by the high current arc. These properties, which include collapsibility when subjected to the pressure shock wave produced by the arc, low thermal conductivity, and high melting and boiling points, are discussed in more detail in the aforesaid Urbanek et al application Ser. No. 08/163,273.

Figure 7:
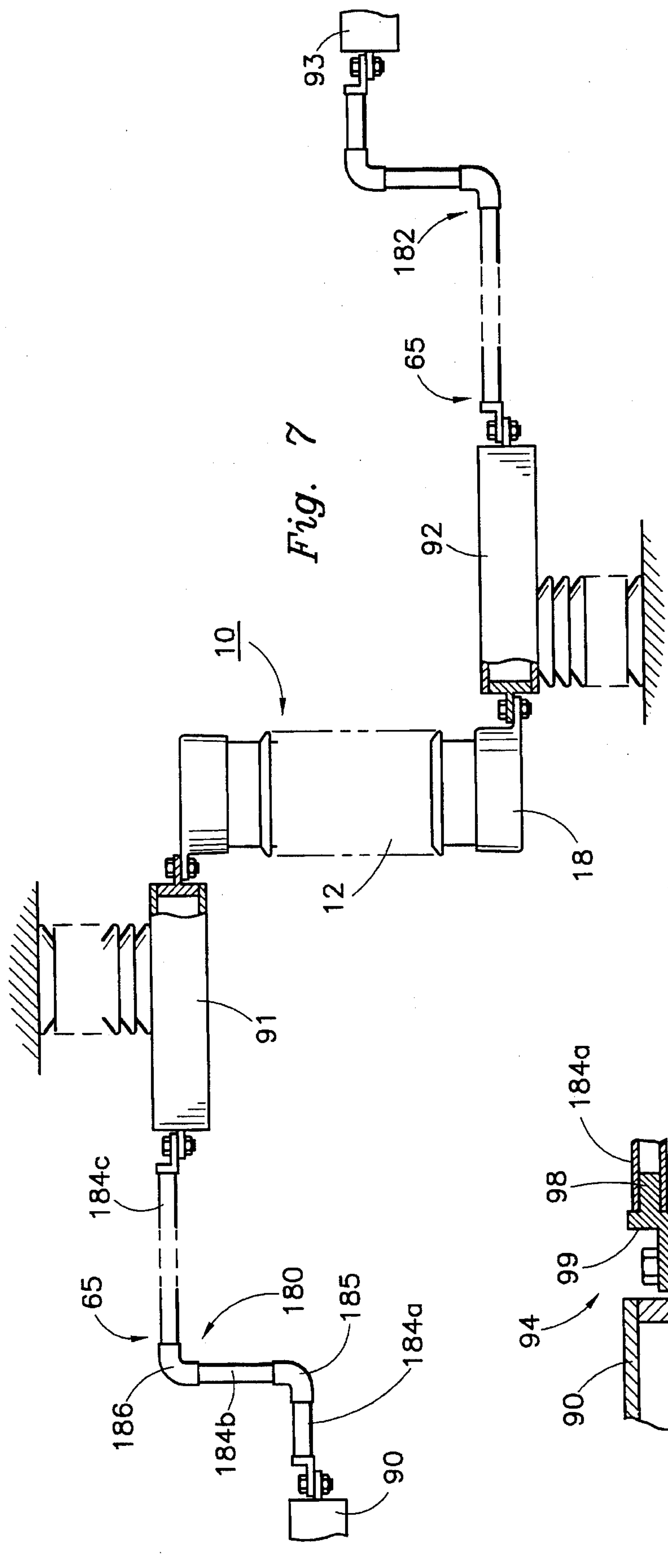
FIG. 7 is a side-elevational view of a portion of the overvoltage protective circuit present in the compensation equipment of FIG. 1. Contained in FIG. 7 are the surge arrester of FIG. 2 and a portion of the conductor means that connects the surge arrester into the power line.

The present invention provides additional protection for protecting the porcelain housing 12 of the arrester against rupture in the event that one or more of the varistor elements should fail during operation of the arrester under the above-described extreme high-energy conditions. In accordance with the present invention, the electric bus structure 65 that connects the arrester 10 into the power circuit is constructed, in part, as bus conductor made of stainless steel. In one embodiment of the invention, the stainless-steel bus conductor is about 80 feet in total length. In this embodiment, which is illustrated in FIG. 7, the stainless-steel bus conductor comprises two sections 180 and 182, one at each side of the surge arrester 10. In each of these sections, the stainless-steel bus conductor is of a tubular configuration and has a circular transverse cross-section. The inner diameter of this bus conductor is about 1 inch and the outer diameter is about 1.31 inches. A preferred type of stainless steel for this application is American Iron and Steel Institute Type 310, which is an austenitic stainless steel consisting essentially, by weight, of about 18% chromium, 8% nickel, remainder iron. Tubing of this form and composition is often referred to as 1 inch IPS Schedule 40 Type 310 stainless steel tubing. While Type 310 stainless steel is a preferred material for this application, other types of stainless steel having similar properties (soon to be described) may instead be utilized.

The conventional approach for connecting the arrester into the power circuit is to use aluminum bus conductor for the bus structure 65 of FIG. 1. The minimum cross-section of such aluminum bus conductor is determined by the maximum permissible temperature rise of the bus conductor during the most onerous current conditions anticipated. In this particular application, tubular aluminum bus conductor having an inner diameter of about 4 to 6 inches and a wall thickness of about ⅜ inch would be utilized. Its maximum temperature under the current conditions depicted in FIG. 6 (assuming current component 70 has a frequency of 2800 Hz and a peak value of 390 kA) would be about 50° C.

The stainless-steel bus conductor 180, 182 that we use for this purpose has a much higher resistance than such aluminum bus conductor, i.e., about 1.2 milliohms per foot at 20° C. Under the fault conditions depicted in FIG. 6, the temperature of the stainless-steel bus conductor at its hottest points might rise to about 500° C. While this is a much higher temperature than is developed with the above-described aluminum bus conductor, it presents no hazard to our bus because the type of stainless steel that we use for this bus conductor can easily withstand these temperatures without damage. Such stainless steel is commonly used in boilers, heat exchangers, and chemical reactors, where it is often exposed without damage to continuous operation in uncontrolled atmospheres at much higher temperatures than it will see in the present application. More specifically, continuous operation for this material is allowed in uncontrolled atmospheres at temperatures up to 800° C. It should be further noted that in the present application, the high temperatures, rather than being continuously applied, are present only for very short periods, i.e., only during high current fault periods; and this further reduces the duty imposed upon the material.

To accommodate the thermal expansion that results from the above-described temperature rise, each of the stainless-steel bus sections 180 and 182 is constructed with two bends that allow for the required expansion and contraction without imposing injurious stresses on the bus section and its supports. Referring to FIG. 7, these bends are provided by constructing each bus section of three lengths joined together in series by elbows welded to the adjacent lengths at opposite sides of each elbow. For example, the bus section 180 is constructed of three lengths 184*a*, 184*b*, and 184*c* of tubing joined together by elbows 185 and 186. Elbow 185 is welded between lengths 184*a* and 184*b*, and elbow 186 is welded between lengths 184*b* and 184*c*. The middle length 184*b* extends transversely of the other two lengths 184*a* and 184*c* so that all of these lengths can expand and contract to produce a slight bending of the lengths without overloading supporting insulators. The required amount of such bending is small since even at maximum temperature, the bus conductor expansion is less than 1%.

Figure 8:
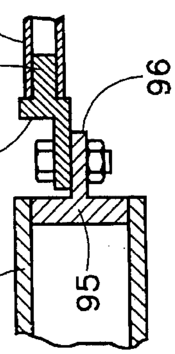
FIG. 8 is an enlarged side-elevational view partially in section of a joint present in the conductor means of FIG. 7.

In the illustrated embodiment, the electric bus structure 65 is constructed only partially of the above-described stainless-steel bus conductor. The remainder of the bus structure is constructed of tubular bus conductor of a high conductivity metal, such as aluminum, which bus conductor is of a much larger diameter than the stainless-steel bus conductor. In the embodiment of FIG. 7 such aluminum bus conductor comprises four lengths 90, 91, 92, and 93 of bus conductor. These aluminum bus lengths are joined to adjacent stainless-steel bus lengths by joints 94, each having essentially the construction depicted in more detail in FIG. 8. Referring to FIG. 8, an aluminum plug 95 having a projecting lug 96 at its outer side is welded within the tubular portion of the aluminum bus length 90 at one end of the length. At the adjacent end of the stainless-steel bus length 184*a*, there is an adapter comprising a stainless steel plug 98 having an L-shaped stainless-steel terminal 99 welded thereto at the outer side of the plug 98. The plug 98 fits tightly within the stainless-steel tubing and is welded thereto. The aluminum lug 96 and the stainless-steel terminal 99 are bolted together to complete the joint.

While we refer herein to the additional bus conductor as aluminum bus conductor, it is to be understood that this additional bus conductor could be of other high-conductivity metals such as copper or copper alloys. The term aluminum, as used herein, is intended to comprehend high-conductivity aluminum alloys.

While the temperature of the stainless-steel bus conductor briefly reaches a high value during a line fault that causes a varistor failure (as depicted in FIG. 6), the actual heat content is low because of the short duration of this condition. So heating of the aluminum bus conductor is quite low, even at its contact surface with the stainless-steel bus conductor. No damage will be done to the aluminum bus conductor or the connecting joint in view of the low extent of the heating. While the stainless-steel bus conductor is briefly heated to a high temperature, it is easily capable of withstanding the high temperature without damage for the reasons stated hereinabove. In the event of a failure of the arrester, only the arrester itself will require replacement. No parts of the bus structure 65 will require replacement.

The additional resistance introduced into the overvoltage protective circuit by the stainless-steel bus conductor has the very beneficial effect of significantly reducing the energy dissipated in the arrester should a varistor failure occur. The total energy stored in the capacitor bank at the time that any varistor-shorting arc develops within the arrester will dissipate proportionally in the effective resistances of the discharge circuit. Assuming that the capacitor bank has a stored energy of 3.31 MJ, that the above-described 80 foot stainless steel bus conductor has a resistance of about 0.055 ohms, and that the arrester containing an arc shorting the varistor stacks has an equivalent resistance of about 0.025 ohms, then the energy dissipated in the arrester will be approximately $$\frac{.025}{(.025+.055)}\times 3.31\text{ MJ or }1.03\text{ MJ.}$$

This is a significant reduction as compared to the energy dissipated in the arrester when the arrester is connected in the power circuit by an essentially zero-resistance bus. In this latter equipment essentially all the capacitor energy (3.31 MJ) is dissipated in the arrester. In a more practical equipment, e.g., one in which the arrester is connected in the power circuit solely by large-diameter aluminum bus conductor, the bus conductor will have a small resistance, which our studies indicate is about 0.020 ohms. In such an equipment, the energy dissipated in the arrester containing an arc shorting its varistor stacks will be approximately $$\frac{.025}{(.025+.020)}\times 3.31\text{ MJ or }1.84\text{ MJ.}$$

Comparing the illustrated equipment to this latter equipment, it will be apparent that the presence of the stainless-steel bus conductor reduces the energy dissipation requirement of the arrester by about 44%. This is a significant reduction, which substantially reduces the chances that the arrester housing will shatter should a varistor element fail and produce the current conditions illustrated in FIG. 6.

In the above calculations of the energy dissipated in the arrester, the resistance of the arrester while containing an arc shorting its varistor stacks was assumed to be 0.025 ohms. It is to be understood that the actual resistance during the arcing period is not a constant quantity but rather is a non-linearly varying quantity dependent upon arc length, arc current, pressure within the arrester housing, heat transfer from the arc column, and other factors. The assumed 0.025 ohm value is an equivalent linear value equal to $R_{arc}$, where $R_{arc}$ is the arc resistance as determined by:

$$R_{arc}=\frac{W_{arc}}{\int I^2\,dt}$$

where $W_{arc}$ is the arc energy, I is the current through the arc, and t is time.

Another beneficial effect resulting from the presence of the stainless-steel bus is that the stainless-steel bus conductor has a much smaller diameter than the aluminum bus conductor conventionally used in this type of equipment. This smaller diameter results in a capacitor-discharge path with a higher inductance, and this higher inductance will decrease the frequency of the capacitor-discharge current, thereby slowing the rate of energy input into the arrester. Slowing the rate of energy input into the arrester reduces the severity of the thermal and pressure shock waves applied to the arrester housing, thus decreasing the chances that the housing will be shattered by such shock waves.

While the increased resistance and inductance of the overvoltage protection circuit 69 will result in a slight increase in the protective level, i.e., the maximum level of voltage allowed by the arrester to develop across the capacitor, this increase is so small as to be insignificant. This increase will depend upon the magnitude of the fault current, but even for the worst-case fault condition, a momentary overshoot of only about 2.2% is anticipated, and this is so small as to be insignificant.

Because the stainless-steel bus is a sturdy structure located externally of the arrester, a failure of the arrester normally will not damage the bus. Such a failure will normally require replacement of only the arrester in order to restore the equipment to a working condition. No other components normally will be adversely affected by the arrester failure.

Another advantage of using an externally-located stainless-steel bus for introducing resistance into the protection circuit is that no modification of the arrester 10 is required to accommodate the added resistance. We considered adding the desired resistance by providing wound resistors in a location within the arrester. But this approach was rejected because, among other disadvantages, such resistors are relatively expensive and their inclusion would have required modification of the arrester to accommodate them.

The stainless-steel bus that we utilize in our equipment for providing the desired added protection for the arrester housing is structurally simple, rugged, and reliable, all of which are significant advantages.

While in the illustrated embodiment the bus conductor sections are of tubular form and of circular cross-section, it is to be understood that bus conductor sections of other forms and cross-section could instead be used. The illustrated form and cross-section are, however, preferred.

While we have shown and described a particular embodiment of our invention, it will be apparent to those skilled in the art that various changes and modifications may be made without departing from our invention in its broader aspects; and we, therefore, intend herein to cover all such changes and modifications as fall within the true spirit and scope of our invention.

What we claim is:

1. Series-capacitor compensation equipment comprising:

(a) a series-capacitor bank for connection in series with a power line, (b) an overvoltage protection circuit for the series-capacitor bank for connection in series with said power line and in parallel with said series-capacitor bank, the overvoltage protection circuit comprising the series combination of a surge arrester and bus structure, the surge arrester comprising an insulating housing and varistor elements within said housing, said bus structure being located externally of said housing and connected in series with said varistor elements, and in which:

(c) said bus structure comprises stainless-steel bus conductor having a resistance that is sufficiently high to effectively limit the energy duty on the surge arrester during discharge of said series-capacitor bank through said overvoltage protection circuit in the event of a failure of a varistor element during surge-arrester operation.

2. The series capacitor compensation equipment of claim 1 in which the resistance of said stainless-steel bus conductor is sufficiently high to prevent rupture of said insulating housing as a result of discharge of said series-capacitor bank through said overvoltage protection circuit in the event of a failure of a varistor element during surge-arrester operation.

3. The series-capacitor compensation equipment of claim 1 in which the resistance of said stainless steel bus conductor is sufficiently high as to limit the peak amplitude of the capacitor-discharge current to a value substantially lower than that which would flow under corresponding capacitor discharge conditions in an otherwise corresponding series-capacitor compensating equipment in which the surge arrester is connected into the power circuit by bus structure made substantially entirely of aluminum bus conductor of much larger cross-section than the stainless-steel bus conductor.

4. The series-capacitor compensation equipment of claim 1 in which said stainless-steel bus conductor has a relatively small transverse cross-section as compared to that of the aluminum bus conductor present in an otherwise corresponding series-capacitor compensation equipment in which the surge arrester is connected into the power circuit by bus structure made substantially entirely of aluminum bus conductor and large enough in transverse cross-section to avoid overheating should the capacitor bank discharge therethrough as a result of a varistor element failure during a fault on said power line.

5. The equipment of claim 4 in which the transverse cross-section of said stainless-steel bus conductor is sufficiently small as to provide an increased inductance that substantially reduces the frequency of the capacitor-discharge current as compared to the frequency of the capacitor-discharge current that flows under corresponding capacitor-discharge conditions in said otherwise corresponding equipment.

6. The series-capacitor compensation equipment of claim 1 in which said stainless-steel bus is several tens of feet in length.

7. The series-capacitor compensation equipment of claim 1 in which said stainless-steel bus conductor is made of a stainless steel capable of continuous operation without damage in an uncontrolled atmosphere at temperatures up to 800° C.

8. The series-capacitor compensation equipment of claim 1 in which said stainless-steel bus conductor is of a stainless steel consisting essentially of, by weight, about 18% chromium, about 8% nickel, and about 74% iron.

9. The series-capacitor compensation equipment of claim 1 in which said stainless-steel bus conductor includes a plurality of series-connected lengths interconnected by bends that allow said lengths to bend in response to thermal expansion of the lengths when heated by high currents therethrough.

10. The series-capacitor compensation equipment of claim 1 in which said bus conductor structure further comprises additional bus conductor electrically connected in series with said stainless-steel bus conductor, said additional bus conductor being made of at least one of aluminum, copper, or alloys thereof.

* * * * *